(12) United States Patent
Kim et al.

(10) Patent No.: US 9,747,499 B2
(45) Date of Patent: Aug. 29, 2017

(54) SYSTEMS AND METHODS FOR DETECTION AND HIGH-QUALITY CAPTURE OF DOCUMENTS ON A CLUTTERED TABLETOP WITH AN AUTOMATICALLY CONTROLLED CAMERA

(71) Applicant: FUJI XEROX CO., LTD., Tokyo (JP)

(72) Inventors: Chelhwon Kim, Santa Cruz, CA (US); Patrick Chiu, Mountaion View, CA (US); Hao Tang, San Jose, CA (US)

(73) Assignee: FUJI XEROX CO., LTD., Tokyo (JP)

( * ) Notice: Subject to any disclaimer, the term of this patent is extended or adjusted under 35 U.S.C. 154(b) by 230 days.

(21) Appl. No.: 14/637,391

(22) Filed: Mar. 3, 2015

(65) Prior Publication Data

US 2016/0259971 A1    Sep. 8, 2016

(51) Int. Cl.
*G06K 9/20* (2006.01)
*G06K 9/00* (2006.01)
(Continued)

(52) U.S. Cl.
CPC .......... *G06K 9/00442* (2013.01); *G06K 9/18* (2013.01); *G06K 9/3233* (2013.01); *G06K 9/4633* (2013.01); *G06K 9/4642* (2013.01); *G06T 3/4038* (2013.01); *G06T 5/50* (2013.01); *H04N 5/23238* (2013.01); *G06T 2207/10016* (2013.01); *G06T 2207/20221* (2013.01)

(58) Field of Classification Search
CPC .... G06K 9/00442; G06K 9/18; G06K 9/4633; G06K 9/4642; G06T 3/4038; G06T 5/50; G06T 7/004; H04N 5/23238
See application file for complete search history.

(56) References Cited

U.S. PATENT DOCUMENTS 5,677,776 A * 10/1997 Matsuda ................. H04N 1/38
355/25
5,764,379 A * 6/1998 Matsuda .............. H04N 1/1013
355/23
(Continued)

OTHER PUBLICATIONS

Clark, P., Mirmhedi, M. Rectifying perspective views of text in 3D scenes using vanising points, Pattern Recognition 36 (2003) 2673-2686.
(Continued)

*Primary Examiner* — Christopher Findley
(74) *Attorney, Agent, or Firm* — TransPacific Law Group; Pavel I. Pogodin, Esq.

(57) ABSTRACT

Described are systems and methods for recognizing paper documents on a tabletop using an overhead camera mounted on pan-tilt servos. The described automated system first finds paper documents on a cluttered desk based on a text probability map, constructed using multiple images acquired at fixed grid positions, and then captures a sequence of high-resolution overlapping frames of the located document (s), which are then fused together and perspective-rectified, using computed homography, to reconstruct a high quality and fronto-parallel document image that is of sufficient quality required for optical character recognition. The extracted textual information may be used, for example, for indexing and search, document repository and/or language translation applications.

20 Claims, 12 Drawing Sheets

(51) Int. Cl.
*G06K 9/18* (2006.01)
*G06K 9/46* (2006.01)
*G06T 5/50* (2006.01)
*H04N 5/232* (2006.01)
*G06T 3/40* (2006.01)
*G06K 9/32* (2006.01)

(56) References Cited

U.S. PATENT DOCUMENTS

| | | | | | |
|---|---|---|---|---|---|
| 5,764,383 | A | * | 6/1998 | Saund | H04N 1/113 355/25 |
| 5,831,750 | A | * | 11/1998 | Okisu | H04N 1/00681 355/25 |
| 5,995,245 | A | * | 11/1999 | Moro | H04N 1/02409 358/474 |
| 7,123,292 | B1 | * | 10/2006 | Seeger | G03B 5/02 348/218.1 |
| 7,330,604 | B2 | * | 2/2008 | Wu | G06K 9/3283 382/216 |
| 8,699,819 | B1 | * | 4/2014 | Ziegler | G06K 9/6201 358/497 |
| 2010/0303354 | A1 | * | 12/2010 | Reznik | G06K 9/4642 382/168 |
| 2013/0335789 | A1 | * | 12/2013 | Kimura | H04N 1/02815 358/475 |

OTHER PUBLICATIONS

Csurka, G., Dance, C.R., Fan, L, Willamowski, J., Bray, C. (2004). Visual categorization with bags of keypoints. Proc. of ECCV Intl. Workshop on Stat. Learning in Comp. Vision.

Dance, C. R. Perspective estimation for document images. Proc. SPIE Document Recognition IX (2002).

Hartley, R., Zisserman, A. Multiple View Geometry in Computer Vision. Cambridge University Press (2003).

Hwangbo, M., Kanade, I. Visual-inertial uav attitude estimation using urban 643 scene regularities. Robotics and Automation (ICRA 2011), pp. 2451-2458.

Kim, J., Seitz, S., Agrawala, M. Video-based document tracking: Unifying your physical and electronic desktops. Proceedings of UIST '04, pp. 99-107.

Liao, C., et al. Fact: fine-grained cross-media interaction with documents via a portable hybrid paper-laptop interface. Proc. of ACM Multimedia '10, pp. 361-370.

Matas, J. and Galambos, C. and Kittler, J.V., Robust Detection of Lines Using the Progressive Probabilistic Hough Transform. CVIU 78 1, pp. 119-137 (2000).

Muja, M., Lowe, D.G. (2009). Fast Approximate Nearest Neighbors with Automatic Algorithm Configuration, 2009.

Newman, W et al. CamWorks: a video-based tool for efficient capture from paper source documents. Proc. Intl. Conf. on Multimedia Computing and Systems (ICMCS '99), pp. 647-653.

Szeliski, R. (2006). Image alignment and stitching: a tutorial. Found. Trends. Comput. Graph. Vis. 2, 1 (Jan. 2006), 1-104.

\* cited by examiner

SYSTEMS AND METHODS FOR DETECTION AND HIGH-QUALITY CAPTURE OF DOCUMENTS ON A CLUTTERED TABLETOP WITH AN AUTOMATICALLY CONTROLLED CAMERA

BACKGROUND OF THE INVENTION

Technical Field

The disclosed embodiments relate in general to image processing technology and, more specifically, to systems and methods for recognizing and capturing paper documents on a tabletop using an overhead camera mounted on pan-tilt servos.

Description of the Related Art

Many content processing applications including, without limitation, content indexing and search systems, document repositories, and language translation systems rely on automated document detection and capture. On the other hand, conventional systems for automated document detection and capture such as the CamWorks described, for example, in Newman, W., Dance, C., Taylor, A., Taylor, S., Taylor, M., Aldhous, T. (1999) CamWorks: a video-based tool for efficient capture from paper source documents. Proc. Intl. Conf. on Multimedia Computing and Systems (ICMCS '99), pp 647-653 and FACT described, for example, in Liao, C., Tang, H., Liu, Q., Chiu, P., Chen, F. FACT: fine-grained cross-media interaction with documents via a portable hybrid paper-laptop interface. Proc. of ACM Multimedia '10, pp. 361-370, used video cameras with insufficiently low resolutions (640×480 and 960×720, respectively), enabling capture of only small portions of the document page (e.g. a user-selected word or phrase).

However, even with sufficient resolution offered by the modern cameras, the image quality may suffer from noise and geometric distortion. Moreover, the existing systems fail to address realistic usage scenarios, wherein the document pages must be detected on the tabletop that is cluttered with other objects (e.g. coffee mugs, pens, etc.).

Thus, as would be appreciated by those of skill in the art, in view of the aforesaid deficiencies of the conventional technology, new and improved systems and methods are needed to improve the image recognition and reconstruction.

SUMMARY OF THE INVENTION

The embodiments described herein are directed to methods and systems that substantially obviate one or more of the above and other problems associated with the conventional systems and methods for recognizing and capturing paper documents.

In accordance with one aspect of the inventive concepts described herein, there is provided a computer-implemented method being performed in a computerized system incorporating a processing unit, a memory and a camera, the camera being mounted on a turret operatively coupled to the processing unit, the computer-implemented method involving: scanning a surface with the camera to acquire a first plurality of images of the surface; using the acquired first plurality of images of the surface to determine at least one location of a text on the surface; capturing a second plurality of images using the camera based on the determined location of the text on the surface; and extracting the text using the second captured plurality of images.

In one or more embodiments, the processing unit is configured to cause the turret to move the camera during the scanning and capturing.

In one or more embodiments, the first plurality of images is acquired by moving the camera to a plurality of fixed positions along a predetermined path, wherein each image of the first plurality of images corresponds to a fixed position of the plurality of fixed positions, where the image was acquired.

In one or more embodiments, the method further comprises, for each image in the first plurality of images of the surface, computing feature points and a text response map.

In one or more embodiments, the each text response map is computed using a probability histogram, the probability histogram being pre-computed based on the feature points.

In one or more embodiments, the method further comprises stitching the text response maps corresponding to the first plurality of images into a single text response map based on the plurality of fixed positions corresponding to the first plurality of images.

In one or more embodiments, the method further comprises detecting text blobs in the single text response map.

In one or more embodiments, the method further comprises identifying at least one large rectangular shaped blob from the detected text blobs as the location of the text on the surface.

In one or more embodiments, the second plurality of images is captured by moving the camera to a plurality of fixed positions along a predetermined path, wherein each image of the second plurality of images corresponds to a fixed position of the plurality of fixed positions, where the image was captured.

In one or more embodiments, the determined location of the text on the surface is a location of a text blob and the predetermined path is a center line through a bounding box of the corresponding text blob.

In one or more embodiments, the images of the second plurality of images overlap with one another.

In one or more embodiments, the method further comprises stitching and fusing the images of the second plurality of images to obtain a second stitched image.

In one or more embodiments, the method further comprises fitting lines around a boundary of a text blob in the second stitched image and estimating vanishing points.

In one or more embodiments, the method further comprises performing a perspective rectification on the second stitched image based on a computed homography.

In one or more embodiments, the text is extracted using an optical character recognition performed on the perspective rectified second stitched image.

In accordance with another aspect of the inventive concepts described herein, there is provided a non-transitory computer-readable medium embodying a set of computer-executable instructions, which, when executed in a computerized system incorporating a processing unit, a memory and a camera, the camera being mounted on a turret operatively coupled to the processing unit, cause the computerized system to perform a method involving: scanning a surface with the camera to acquire a first plurality of images of the surface; using the acquired first plurality of images of the surface to determine at least one location of a text on the surface; capturing a second plurality of images using the camera based on the determined location of the text on the surface; and extracting the text using the second captured plurality of images.

In one or more embodiments, the processing unit is configured to cause the turret to move the camera during the scanning and capturing.

In one or more embodiments, the first plurality of images is acquired by moving the camera to a plurality of fixed positions along a predetermined path, wherein each image of the first plurality of images corresponds to a fixed position of the plurality of fixed positions, where the image was acquired.

In one or more embodiments, the method further comprises, for each image in the first plurality of images of the surface, computing feature points and a text response map.

In one or more embodiments, the each text response map is computed using a probability histogram, the probability histogram being pre-computed based on the feature points.

In one or more embodiments, the method further comprises stitching the text response maps corresponding to the first plurality of images into a single text response map based on the plurality of fixed positions corresponding to the first plurality of images.

In one or more embodiments, the method further comprises detecting text blobs in the single text response map.

In one or more embodiments, the method further comprises identifying at least one large rectangular shaped blob from the detected text blobs as the location of the text on the surface.

In one or more embodiments, the second plurality of images is captured by moving the camera to a plurality of fixed positions along a predetermined path, wherein each image of the second plurality of images corresponds to a fixed position of the plurality of fixed positions, where the image was captured.

In one or more embodiments, the determined location of the text on the surface is a location of a text blob and the predetermined path is a center line through a bounding box of the corresponding text blob.

In one or more embodiments, the images of the second plurality of images overlap with one another.

In one or more embodiments, the method further comprises stitching and fusing the images of the second plurality of images to obtain a second stitched image.

In one or more embodiments, the method further comprises fitting lines around a boundary of a text blob in the second stitched image and estimating vanishing points.

In one or more embodiments, the method further comprises performing a perspective rectification on the second stitched image based on a computed homography.

In one or more embodiments, the text is extracted using an optical character recognition performed on the perspective rectified second stitched image.

In accordance with yet another aspect of the inventive concepts described herein, there is provided a computerized system incorporating a processing unit, a memory and a camera, the camera being mounted on a turret operatively coupled to the processing unit, the memory storing a set of computer-executable instructions causing the computerized system to perform a method involving: scanning a surface with the camera to acquire a first plurality of images of the surface; using the acquired first plurality of images of the surface to determine at least one location of a text on the surface; capturing a second plurality of images using the camera based on the determined location of the text on the surface; and extracting the text using the second captured plurality of images.

In one or more embodiments, the processing unit is configured to cause the turret to move the camera during the scanning and capturing.

In one or more embodiments, the first plurality of images is acquired by moving the camera to a plurality of fixed positions along a predetermined path, wherein each image of the first plurality of images corresponds to a fixed position of the plurality of fixed positions, where the image was acquired.

In one or more embodiments, the method further comprises, for each image in the first plurality of images of the surface, computing feature points and a text response map.

In one or more embodiments, the each text response map is computed using a probability histogram, the probability histogram being pre-computed based on the feature points.

In one or more embodiments, the method further comprises stitching the text response maps corresponding to the first plurality of images into a single text response map based on the plurality of fixed positions corresponding to the first plurality of images.

In one or more embodiments, the method further comprises detecting text blobs in the single text response map.

In one or more embodiments, the method further comprises identifying at least one large rectangular shaped blob from the detected text blobs as the location of the text on the surface.

In one or more embodiments, the second plurality of images is captured by moving the camera to a plurality of fixed positions along a predetermined path, wherein each image of the second plurality of images corresponds to a fixed position of the plurality of fixed positions, where the image was captured.

In one or more embodiments, the determined location of the text on the surface is a location of a text blob and the predetermined path is a center line through a bounding box of the corresponding text blob.

In one or more embodiments, the images of the second plurality of images overlap with one another.

In one or more embodiments, the method further comprises stitching and fusing the images of the second plurality of images to obtain a second stitched image.

In one or more embodiments, the method further comprises fitting lines around a boundary of a text blob in the second stitched image and estimating vanishing points.

In one or more embodiments, the method further comprises performing a perspective rectification on the second stitched image based on a computed homography.

In one or more embodiments, the text is extracted using an optical character recognition performed on the perspective rectified second stitched image.

Additional aspects related to the invention will be set forth in part in the description which follows, and in part will be obvious from the description, or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive concepts. Specifically.

DETAILED DESCRIPTION

In the following detailed description, reference will be made to the accompanying drawing(s), in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense. Additionally, the various embodiments of the invention as described may be implemented in the form of a software running on a general purpose computer, in the form of a specialized hardware, or combination of software and hardware.

To address the above and other problems associated with the conventional technology, one or more embodiments described herein implement systems and methods for detecting and capturing a paper document on a cluttered tabletop with a sufficiently high quality for performing an optical character recognition (OCR). As would be appreciated by persons of ordinary skill in the art, with recent improvements in image capture hardware, including availability of 4K video cameras having resolution of 4096×2160 pixels, it is possible to tackle the problem of image resolution, because a document page at 300 dpi (a standard resolution for OCR) has a resolution of 3300×2250 pixels, which is similar to the aforesaid resolution of the 4K video cameras.

Figure 1:
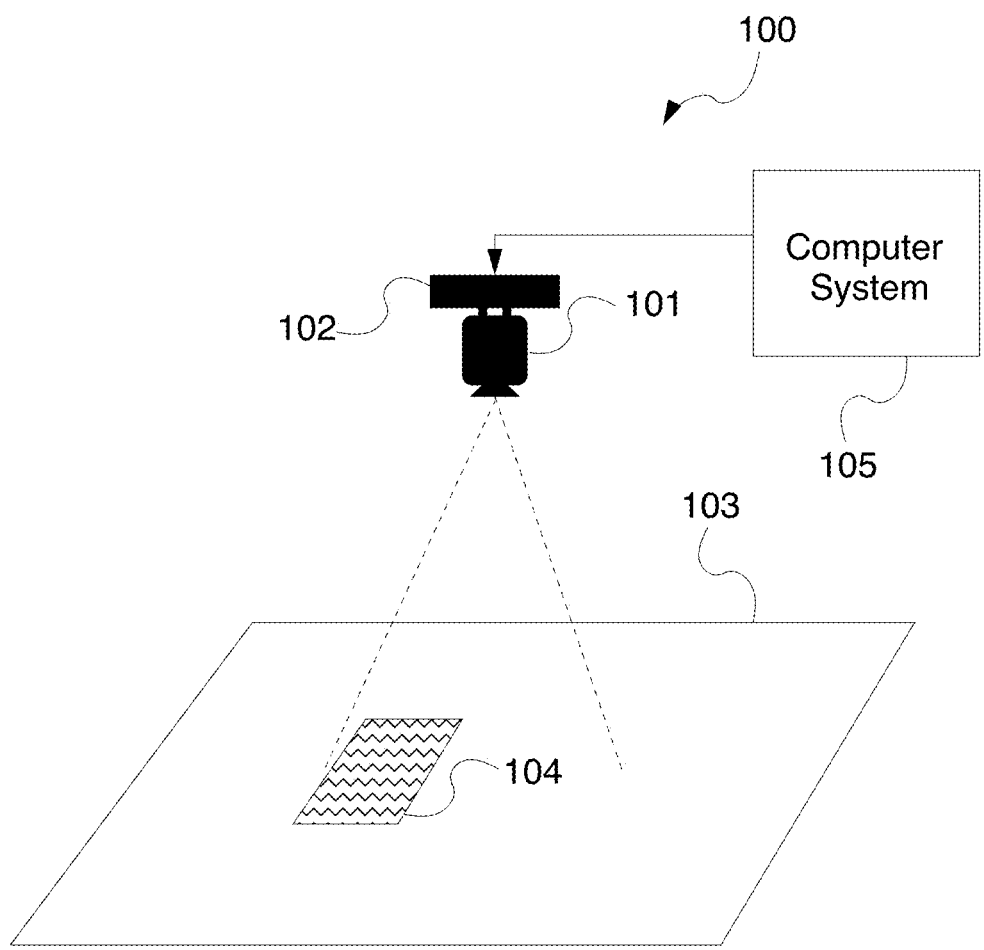
FIG. 1 illustrates an exemplary embodiment of the system for detecting and capturing content from paper documents.

FIG. 1 illustrates an exemplary embodiment of the system 100 for detecting and capturing content from paper documents. In one or more embodiments, the described system 100 for detecting and capturing content from paper documents incorporates a high-resolution (e.g. 4K) camera 101 mounted on a pan-tilt robotic turret 102 above a cluttered work desk or other surface 103. The robotic turret 102 moves the camera 101 to search for document(s) 104 placed anywhere on a cluttered desk 103. Once the document(s) 104 are detected, the camera 101 is moved by the robotic turret 102 to point at the detected document pages to capture high-resolution images of the document(s) 104. These high-resolution images are, in turn, used by an OCR engine executing on a computerized system 105 to convert captured document content to text.

In one or more embodiments, the imaging resolution of the camera 101 is at least 4096×2160 pixels. However, as would be appreciated by persons of ordinary skill in the art, the invention is not limited to a specific resolution of the camera 101 and cameras with any other suitable resolution may be used. In one or more embodiments, the distance from the camera 101 to the center of the desk 103 is calculated such as to achieve the resolution of about 300 dpi of the acquired image of the document 104 with approximately 20 pixels x-height to achieve optimal OCR performance.

Figure 2A:
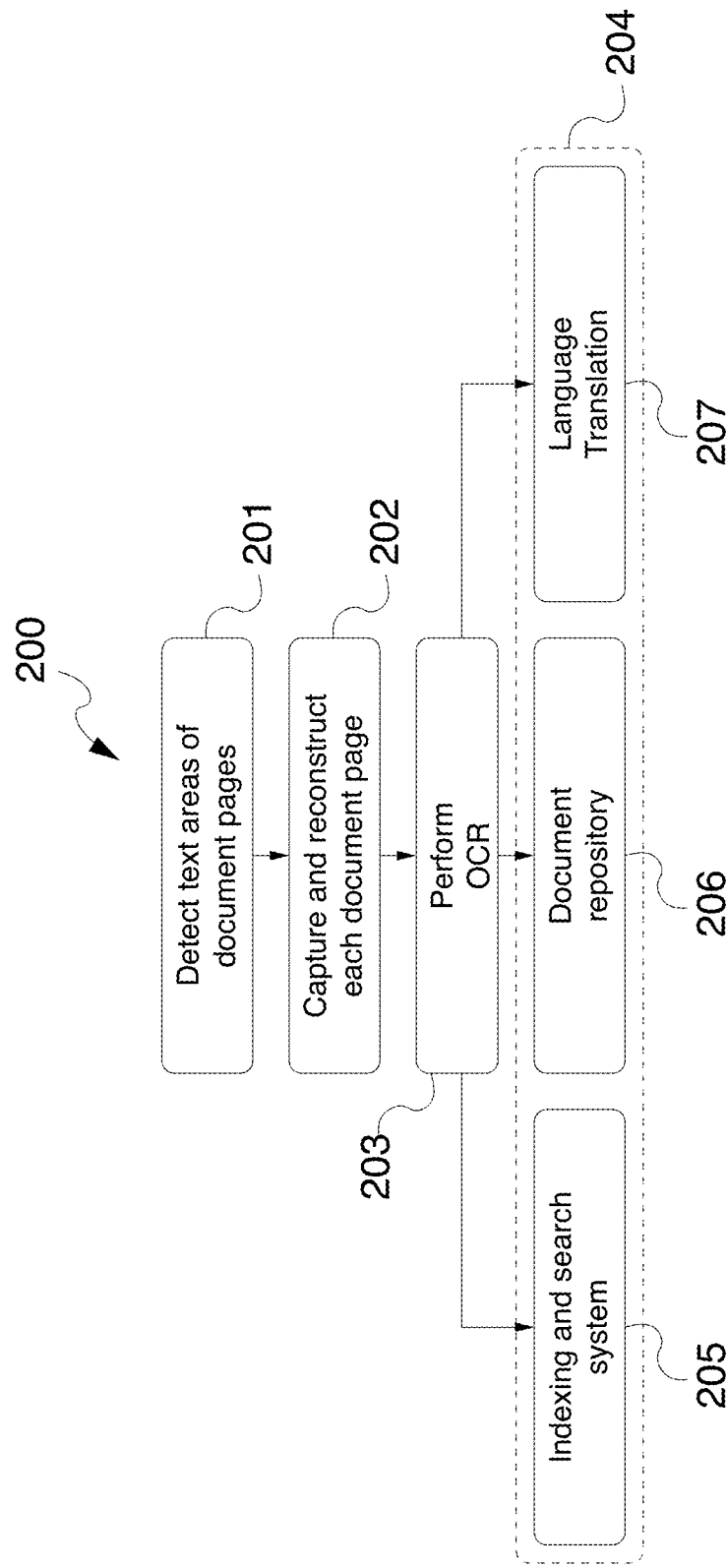
FIG. 2(a) illustrates an exemplary operating sequence of an embodiment of the system for detecting and capturing content from paper documents.

FIG. 2(a) illustrates an exemplary operating sequence 200 of an embodiment of the system 100 for detecting and capturing content from paper documents. First, at step 201, the system 100 uses the camera 101 in conjunction with the image processing software application executing on the computerized system 105 to detect areas of document pages that contain textual information. Subsequently, at step 202, the system 100 uses the camera 101 and the aforesaid image processing software application to capture and reconstruct each document page. At step 203, the aforesaid OCR operation is performed on the captured imaging information. The text output by the aforesaid OCR operation is used in various applications 204, which may include indexing and search system 205, document repository 206 and/or language translation 207.

Figure 2B:
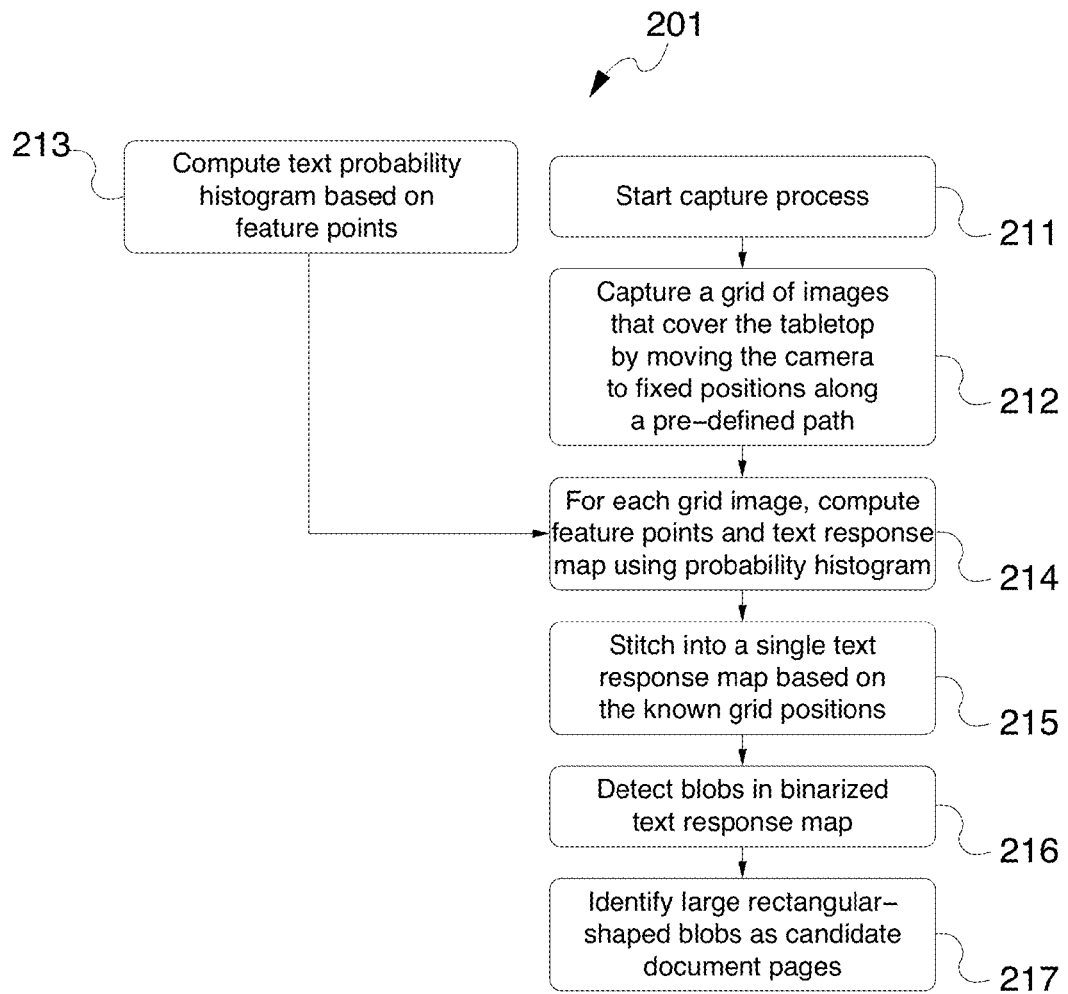
FIG. 2(b) illustrates an exemplary operating sequence of the step for detecting areas of document pages that contain textual information of the process shown in FIG. 2(a).
Figure 2C:
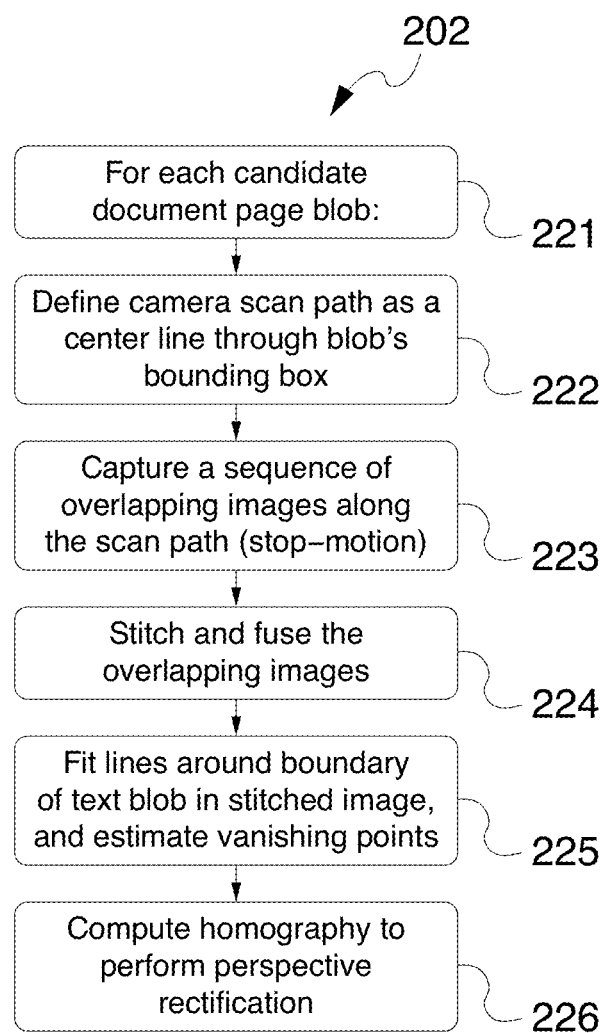
FIG. 2(c) illustrates an exemplary operating sequence for the step for capturing and reconstructing each document page of the process shown in FIG. 2(a).
Figure 3A:
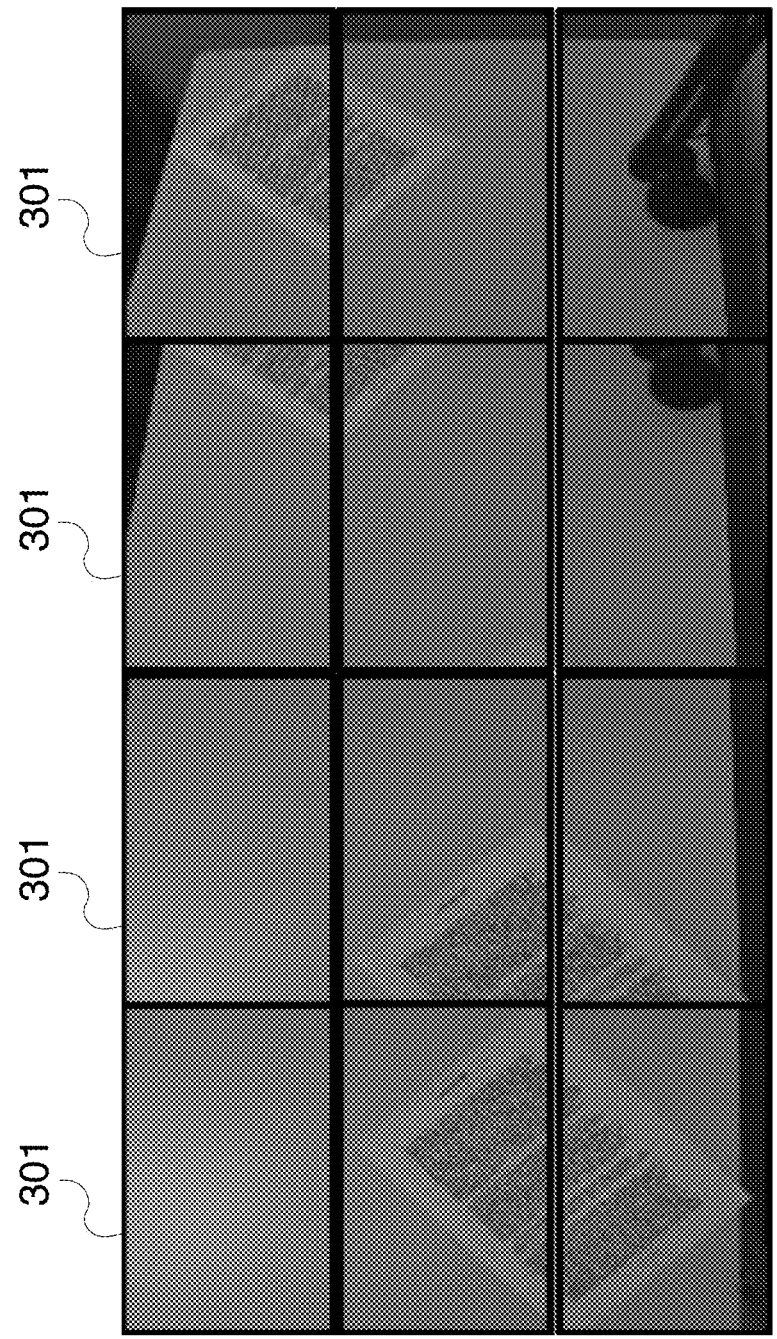
FIGS. 3(a), 3(b), 3(c), 3(d) and 3(e) further illustrate the operation of an exemplary embodiment of the system.

FIG. 2(b) illustrates an exemplary operating sequence of the aforesaid step 201 for detecting areas of document pages that contain textual information of the process 200 shown in FIG. 2(a), while FIG. 2(c) illustrates an exemplary sequence for step 202 for capturing and reconstructing each document page. FIGS. 3(a) through 3(e) further illustrate the operation of the system 100 during these process steps. First, at step 211, the capture process is started. The system 100 then scans the desk 103 by moving the camera 101 along a predefined path while it stops and captures a part of the surface of the desk 103 at predetermined grid positions, see step 212 in FIG. 2(b). FIG. 3(a) shows twelve (3×4) exemplary desk images 301 captured during this first step of the described process.

Figure 3B:
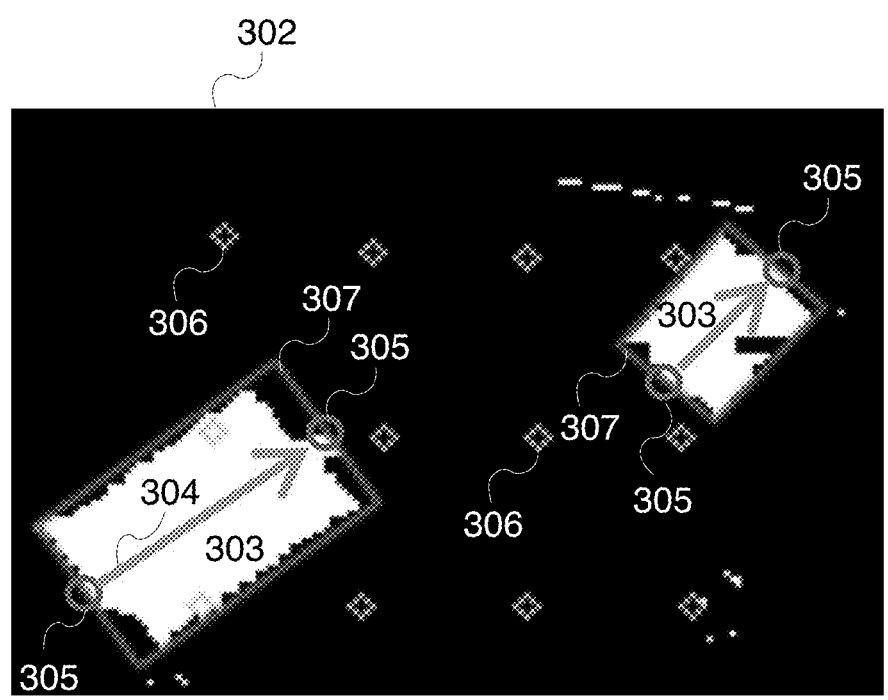
Figure 3C:
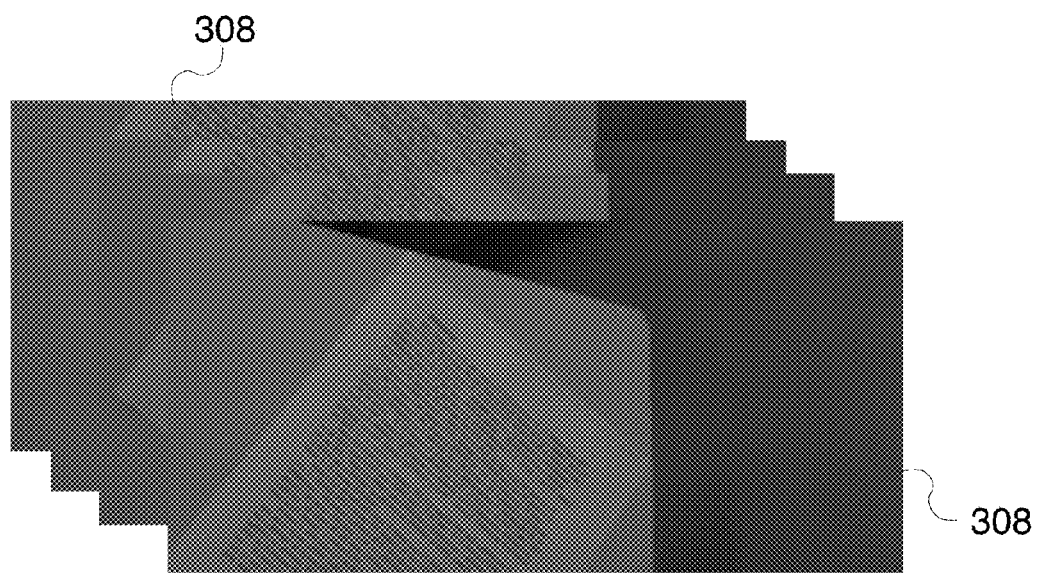
Figure 3D:
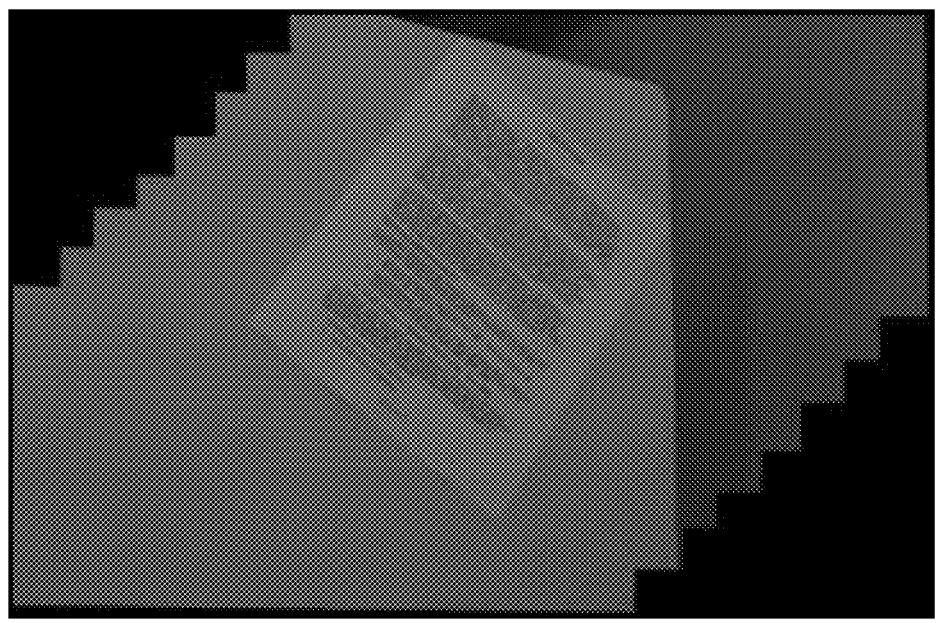
Figure 3E:
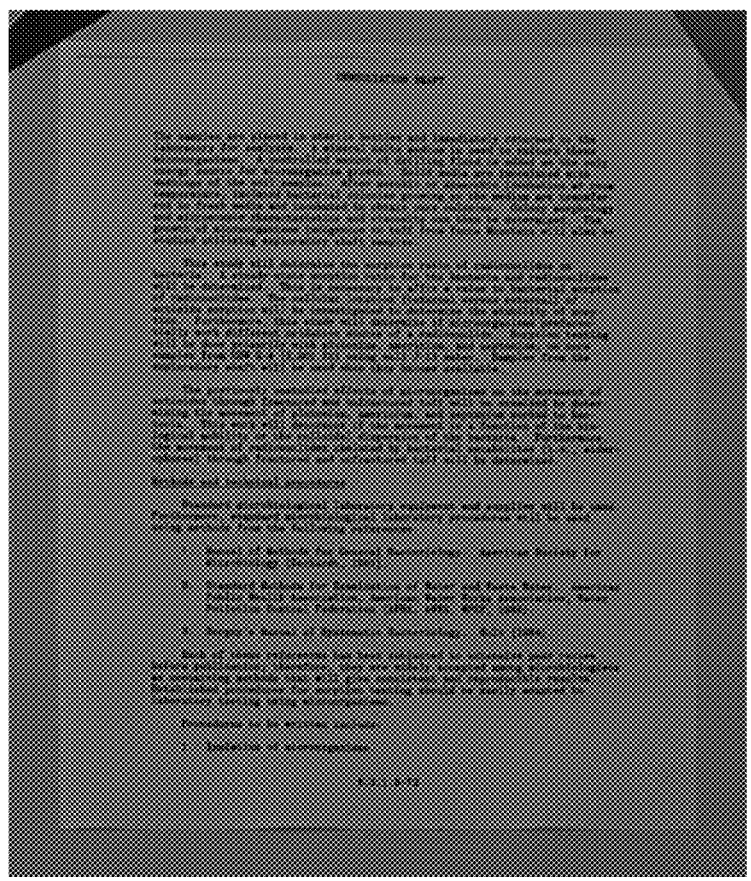

In one or more embodiments, at step 214 shown in FIG. 2(b), the captured desk images 301 are then converted into a text response map 302 by using a pre-computed (at step 213 in FIG. 2(b)) text probability histogram and an image-stitching method based on known camera 101 orientations recorded at the positions, as shown in FIG. 3(b). By detecting text blobs 303 from the text response map 302, which indicate the locations of document papers 104 on the desk 103, the system 100 automatically generates scan paths 304 shown in FIG. 3(b), whereon the camera's 101 viewpoint moves and captures a sequence of frames 308, see FIG. 3(c). In one or more embodiments, the camera 101 stops moving when it captures a frame. The captured frames are fused together by the conventional image-stitching method, well known to persons of ordinary skill in the art, see FIG. 3(d). Finally, the system 100 corrects the perspective distortion in the fused document image by finding a quadrilateral formed by two horizontal lines along the text lines and two vertical lines along the vertical paragraph margins, see FIG. 3(e). After that, the rectified document image 306 is provided to the OCR engine.

Document Paper Detection

In one or more embodiments, in order to detect text regions 303 in the captured image, the system 100 uses an image classification approach described, for example, in Csurka, G., Dance, C. R., Fan, L, Willamowski, J., Bray, C. (2004). Visual categorization with bags of keypoints. Proc. of ECCV Intl. Workshop on Statistical Learning in Computer Vision. In the described embodiment, the system 100 does not use multiple categories of images and only determines the text areas in the image. In one or more embodiments, instead of building a classifier for {text, non-text}, the system 100 is configured to compute a histogram of text occurrences based on scale-invariant feature transform (SIFT) keypoint features and use this to compute the probability map of a new image. In one or more embodiments, this normalized histogram is pre-computed offline, see step 213 in FIG. 2(*b*).

Subsequently, in one or more embodiments, each one of the desk images 301 shown in FIG. 3(*a*) is converted into a text response map 302 shown in FIG. 3(*b*) by a weighted two-dimensional (2D) Gaussian kernel density estimate based on SIFT keypoints detected in the respective image 301. In one or more embodiments, the weights of Gaussian kernels are the normalized frequencies of visual words associated with the corresponding feature descriptors. In one or more embodiments, the system 100 uses the fast K-nearest neighbor search algorithm described, for example, in Muja, M., Lowe, D. G. (2009). Fast Approximate Nearest Neighbors with Automatic Algorithm Configuration, to find the associated visual words given the query feature descriptors. In one or more embodiments, the bandwidth of Gaussian kernel is determined empirically to smooth the response map.

In one or more embodiments, all the computed text response maps 302 are stitched together by estimating relative shift for each image of the desk 103 with respect to one particular image based on homography induced by the relative camera 101 orientations based on the pan-tilt parameters of the camera 101, see step 215 in FIG. 2(*b*). It should be noted that the conventional point feature based stitching algorithm relies on ability of detecting and matching a substantial number of point features across views. Unfortunately, robust point detection and matching on the homogeneous desk surface can be challenging, as the density of detectable points may be low.

In one or more embodiments, the final binary map is computed by thresholding the stitched response map and applying a morphological filter, as illustrated in FIG. 3(*b*). In one or more embodiments, the text blobs 303 in the binary map shown in FIG. 3(*b*) are detected by the connected component labeling (rectangles 307 shown in FIG. 3(*b*)), see steps 216 and 217 in FIG. 2(*b*). Because each text blob 303 indicates the candidate location of a document paper 104 on the desk 103, the system 100 defines a camera 101 scan path over the document paper 104 by selecting the top and bottom center of the text blob 303 (circles 305 in FIG. 3(*b*)) and generates a list of camera 101 capture points on a line joining the two points 305 (arrows 304 in FIG. 3(*b*)), see step 222 in FIG. 2(*c*), which is performed for each candidate document page blob, see step 221 in FIG. 2(*c*). For each point 305, the system 100 determines the corresponding pan and tilt values (camera 101 orientation) by interpolating (or extrapolating) the known nearby data points that are the locations of the aligned image tiles in the map (circles 306 in FIG. 3(*b*)). Finally, a sequence of images captured at the list of points at step 223 in FIG. 2(*c*), sis processed to reconstruct a document image. FIG. 3(*c*) illustrates an exemplary set of images 308 captured by the camera 101 at such points along the scan path 304.

Reconstruction of Document Image

Subsequently, in one or more embodiments, at step 224 in FIG. 2(*c*), the multiple document images captured by the camera 101 are stitched together by one or well-known in the art image-stitching methods, described, for example in Image alignment and stitching: a tutorial. Found. Trends. Comput. Graph. Vis. 2, 1 (January 2006), 1-104. In one or more embodiments, all images are first aligned by estimating a relative shift for each frame with respect to one particular frame. Because the images contain sufficient textures on text regions, the system 100 uses point feature based homography instead of using Eqn. 1. Nomography produces the relative shift of pixels with sub-pixel accuracy, such that the interpolation is necessary when the pixels in each frame are brought to the reference image pixel grid. The aligned pixels at the same grid pixel location of the reference image are combined by a simple arithmetic mean. Finally, in one or more embodiments, a sharpening filter is applied to the combined image to remove blurring.

Perspective Rectification

As would be appreciated by persons of ordinary skill in the art, the image reconstructed as described above would still have a perspective distortion, see FIG. 4(*a*). Therefore, the system 100 is configured to correct it and recover the fronto-parallel view of the text to be provided to the OCR engine. One embodiment of an exemplary correction method finds homography between a quadrilateral formed by two horizontal lines along the text lines and two vertical lines along the vertical paragraph margins and its corresponding target quadrilateral (upright rectangle). A similar method has been described in Clark, P., Mirmhedi, M. Rectifying perspective views of text in 3D scenes using vanishing points, Pattern Recognition 36 (2003) 2673-2686.

In one or more embodiments, the system 100 first detects line segments along the text lines by the probabilistic Hough transform algorithm, as described, for example in Matas, J. and Galambos, C. and Kittler, J. V., Robust Detection of Lines Using the Progressive Probabilistic Hough Transform. CVIU 78 1, pp 119-137 (2000). Because the text lines on the paper are parallel each other, their projections onto the image plane converge to one vanishing point. The system 100 estimates the vanishing point using the RANSAC-based method, described, for example, in Hwangbo, M., Kanade, T. Visual-inertial uav attitude estimation using urban 643 scene regularities. Robotics and Automation (ICRA 2011), pp. 2451-2458. The so estimated vanishing point is subsequently used to get top and bottom boundary lines of the source quadrilateral, see step 225 in FIG. 2(*c*).

In addition, in one or more embodiments, the system 100 uses the vertical paragraph margins to obtain the second vanishing point. The end points of the line segments, detected by the Hough transform, are used to estimate two vertical lines using the RANSAC based line-fitting algorithm, see lines 401 and 402 in FIG. 4(*b*). The intersection of the two vertical lines is the second principal vanishing point. Finally, in one or more embodiments, the system 100 is further configured to find a rotated rectangle center around a text blob using the same method as was described above in connection with document paper detection, see the rectangle 403 in FIG. 4(*c*). Then, for the top and bottom sides of the source quadrilateral, the line segments of top and bottom sides of the rotated rectangle are rotated around their midpoint and aligned with the direction from the midpoint to the associated vanishing point. For the left and right sides of the source quadrilateral, the system is configured to use the fitted two vertical lines, see the quadrilateral 404 in FIG. 4(*c*).

In one or more embodiments, the target quadrilateral is estimated by the system 100 by using width/height ratio of a back-projection of the source quadrilateral onto the table surface in space. This involves recovering the 3D coordinates of four vertexes of the source quadrilateral by finding intersecting points between back-projection rays of the vertexes and the table surface.

Figures 4A, 4B, 4C, 4D:
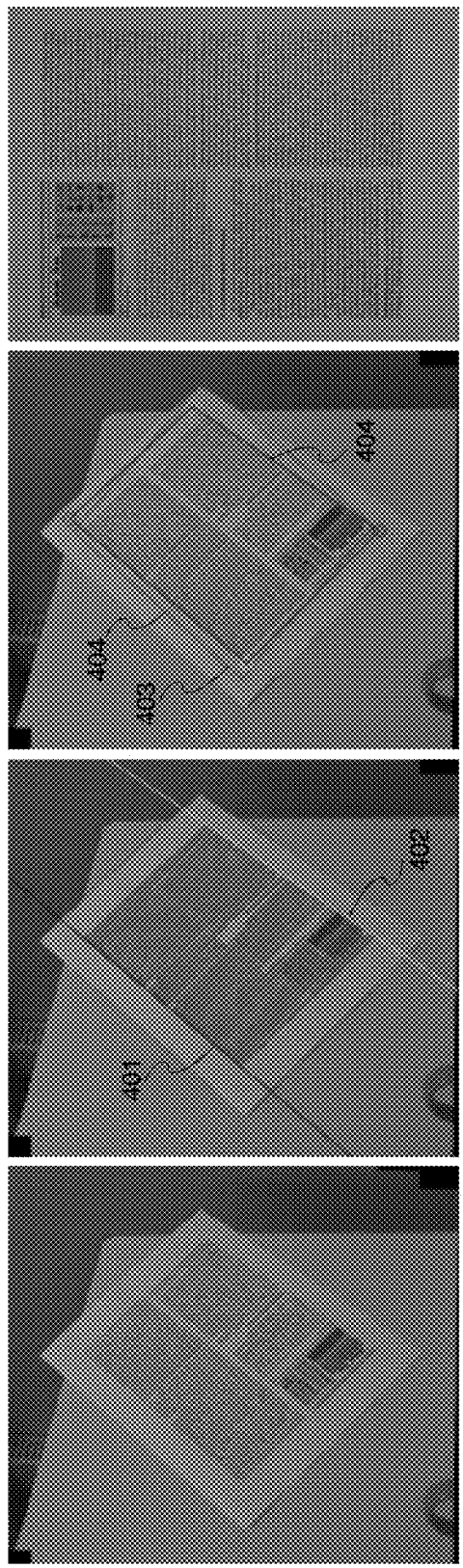
FIGS. 4(a), 4(b), 4(c) and 4(d) illustrate various aspects of an embodiment of a method for perspective distortion correction.
Figure 5C:
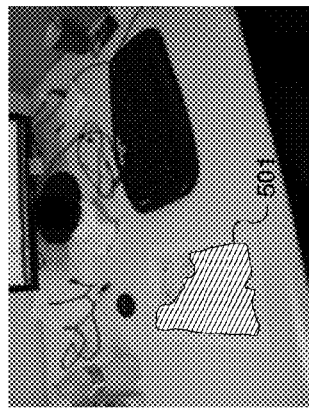
FIGS. 5(a), 5(b) and 5(c) show examples of text response maps computed from cluttered desk images.
Figure 5B:
Figure 5A:
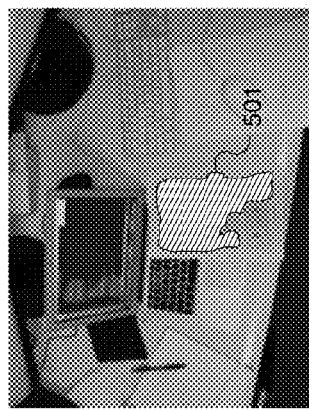

In one or more embodiments, after 3D coordinates of the four vertexes are computed, the aspect ratio is estimated as a ratio between an average length of top and bottom sides and the one of left and right sides of the back-projected quadrilateral on the plane. The width is fixed to a predetermined number of pixels and the height is computed using the pre-computed aspect ratio. After the four vertex correspondences of source and target quadrilateral are computed, the homography is obtained using Direct Linear Transformation algorithm described, for example, in Hartley, R., Zisserman, A. Multiple View Geometry in Computer Vision. Cambridge University Press (2003), see step 226 in FIG. 4(c). An exemplary image with the rectified perspective distortion is shown in FIG. 4(d). In one or more embodiments, the text probability histogram is trained using 800 k SIFT features extracted from about 800 scanned document images in the UNLV-ISR OCR dataset. FIGS. 5(a), 5(b) and 5(c) show examples of text response maps computed from cluttered desk images. In one or more embodiments, only text blobs 501 that remain after application of a text blob size filter, configured to identify text blobs larger than a predetermined size, are selected for further processing, as shown in FIGS. 5(a), 5(b) and 5(c).

Exemplary Computer Platform

Figure 6:
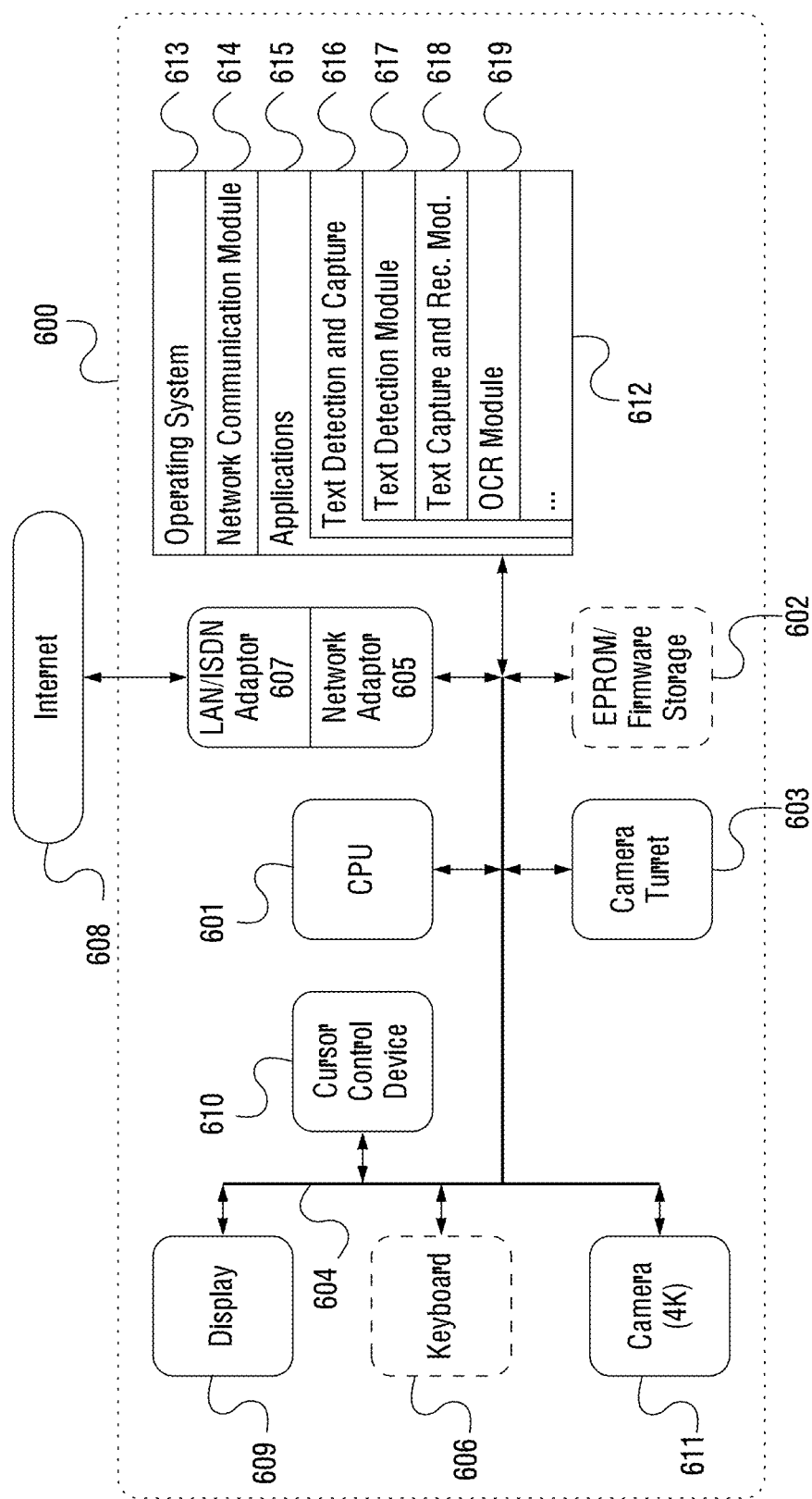
FIG. 6 illustrates an exemplary embodiment of a computerized system for detecting and capturing content from paper documents.

FIG. 6 illustrates an exemplary embodiment of a computerized system 600 for detecting and capturing content from paper documents. In one or more embodiments, the computerized system 600 may be implemented within the form factor of a desktop computer, well known to persons of skill in the art. In an alternative embodiment, the computerized system 600 may be implemented based on a laptop or a notebook computer, a tablet or a smartphone.

The computerized system 600 may include a data bus 604 or other interconnect or communication mechanism for communicating information across and among various hardware components of the computerized system 600, and a central processing unit (CPU or simply processor) 601 electrically coupled with the data bus 604 for processing information and performing other computational and control tasks. Computerized system 600 also includes a memory 612, such as a random access memory (RAM) or other dynamic storage device, coupled to the data bus 604 for storing various information as well as instructions to be executed by the processor 601. The memory 612 may also include persistent storage devices, such as a magnetic disk, optical disk, solid-state flash memory device or other non-volatile solid-state storage devices.

In one or more embodiments, the memory 612 may also be used for storing temporary variables or other intermediate information during execution of instructions by the processor 601. Optionally, computerized system 600 may further include a read only memory (ROM or EPROM) 602 or other static storage device coupled to the data bus 604 for storing static information and instructions for the processor 601, such as firmware necessary for the operation of the computerized system 600, basic input-output system (BIOS), as well as various configuration parameters of the computerized system 600.

In one or more embodiments, the computerized system 600 may incorporate a display device 609, which may be also electrically coupled to the data bus 604, for displaying various information to a user of the computerized system 600, such as the captured text information described above. In an alternative embodiment, the display device 609 may be associated with a graphics controller and/or graphics processor (not shown). The display device 609 may be implemented as a liquid crystal display (LCD), manufactured, for example, using a thin-film transistor (TFT) technology or an organic light emitting diode (OLED) technology, both of which are well known to persons of ordinary skill in the art. In various embodiments, the display device 609 may be incorporated into the same general enclosure with the remaining components of the computerized system 600. In an alternative embodiment, the display device 609 may be positioned outside of such enclosure, such as on the surface of a table or a desk. Also provided may be the camera turret 603 (element 102 in FIG. 1) incorporating various motors and/or actuators configured to move and/or rotate the camera 101 as described above. The camera turret 603 is also attached to the data bus 604.

In one or more embodiments, the computerized system 600 may incorporate one or more input devices, including cursor control devices, such as a mouse/pointing device 610, such as a mouse, a trackball, a touchpad, or cursor direction keys for communicating direction information and command selections to the processor 601 and for controlling cursor movement on the display 609. This input device typically has two degrees of freedom in two axes, a first axis (e.g., x) and a second axis (e.g., y), that allows the device to specify positions in a plane.

The computerized system 600 may further incorporate the high resolution camera 611 for acquiring images of the desk and documents thereon as described above, as well as a keyboard 606, which all may be coupled to the data bus 604 for communicating information, including, without limitation, images and video, as well as user commands (including gestures) to the processor 601.

In one or more embodiments, the computerized system 600 may additionally include a communication interface, such as a network adaptor 605 coupled to the data bus 604. The network adaptor 605 may be configured to establish a connection between the computerized system 600 and the Internet 608 using at least a local area network (LAN) and/or ISDN adaptor 607. The network adaptor 605 may be configured to enable a two-way data communication between the computerized system 600 and the Internet 608. The LAN adaptor 607 of the computerized system 600 may be implemented, for example, using an integrated services digital network (ISDN) card or a modem to provide a data communication connection to a corresponding type of telephone line, which is interfaced with the Internet 608 using Internet service provider's hardware (not shown). As another example, the LAN adaptor 607 may be a local area network interface card (LAN NIC) to provide a data communication connection to a compatible LAN and the Internet 608. In an exemplary implementation, the LAN adaptor 607 sends and receives electrical or electromagnetic signals that carry digital data streams representing various types of information.

In one or more embodiments, the Internet 608 typically provides data communication through one or more subnetworks to other network resources. Thus, the computerized system 600 is capable of accessing a variety of network resources located anywhere on the Internet 608, such as remote media servers, web servers, other content servers as well as other network data storage resources. In one or more embodiments, the computerized system 600 is configured to send and receive messages, media and other data, including application program code, through a variety of network(s) including the Internet 608 by means of the network interface 605. In the Internet example, when the computerized system 600 acts as a network client, it may request code or data for an application program executing on the computerized system 600. Similarly, it may send various data or computer code to other network resources.

In one or more embodiments, the functionality described herein is implemented by computerized system 600 in response to processor 601 executing one or more sequences of one or more instructions contained in the memory 612. Such instructions may be read into the memory 612 from another computer-readable medium. Execution of the sequences of instructions contained in the memory 612 causes the processor 601 to perform the various process steps described herein. In alternative embodiments, hardwired circuitry may be used in place of or in combination with software instructions to implement the embodiments of the invention. Thus, the described embodiments of the invention are not limited to any specific combination of hardware circuitry and/or software.

The term "computer-readable medium" as used herein refers to any medium that participates in providing instructions to the processor 601 for execution. The computer-readable medium is just one example of a machine-readable medium, which may carry instructions for implementing any of the methods and/or techniques described herein. Such a medium may take many forms, including but not limited to, non-volatile media and volatile media.

Common forms of non-transitory computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, an EPROM, a FLASH-EPROM, a flash drive, a memory card, any other memory chip or cartridge, or any other medium from which a computer can read. Various forms of computer readable media may be involved in carrying one or more sequences of one or more instructions to the processor 601 for execution. For example, the instructions may initially be carried on a magnetic disk from a remote computer. Alternatively, a remote computer can load the instructions into its dynamic memory and send the instructions over the Internet 608. Specifically, the computer instructions may be downloaded into the memory 612 of the computerized system 900 from the foresaid remote computer via the Internet 608 using a variety of network data communication protocols well known in the art.

In one or more embodiments, the memory 612 of the computerized system 600 may store any of the following software programs, applications or modules:

1. Operating system (OS) 613 for implementing basic system services and managing various hardware components of the computerized system 600. Exemplary embodiments of the operating system 613 are well known to persons of skill in the art, and may include any now known or later developed mobile operating systems.

2. Network communication module 614 may incorporate, for example, one or more network protocol stacks which are used to establish a networking connection between the computerized system 600 and the various network entities of the Internet 608, using the network adaptor 605.

2. Applications 615 may include, for example, a set of software applications executed by the processor 601 of the computerized system 600, which cause the computerized system 600 to perform certain predetermined functions, such as acquire images of the desk and documents thereon using the camera 611, using the techniques described above. In one or more embodiments, the applications 615 may include the inventive text detection and capture application 616 incorporating the functionality described above.

In one or more embodiments, the inventive text detection and capture application 616 incorporates a text detection module 617 for capturing images of the surface of the desk 103 and paper documents 104 and for detecting text areas of document pages in accordance with the process 201 illustrated in FIG. 2(*b*). In addition, the inventive text detection and capture application 616 may incorporate a document page capture and reconstruction module 618 for performing document page capture and reconstruction in accordance with the process 202 illustrated in FIG. 2(*c*). Further provided may be OCR module 619 for converting captured page images into text. Optionally, other applications deployed in the memory 612 of the system 600 may include indexing and search system, document repository and/or language translation application (not shown), which may receive the text generated by the OCR module 619.

Finally, it should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The present invention has been described in relation to particular examples, which are intended in all respects to be illustrative rather than restrictive. Those skilled in the art will appreciate that many different combinations of hardware, software, and firmware will be suitable for practicing the present invention. For example, the described software may be implemented in a wide variety of programming or scripting languages, such as Assembler, C/C++, Objective-C, perl, shell, PHP, Java, as well as any now known or later developed programming or scripting language.

Moreover, other implementations of the invention will be apparent to those skilled in the art from consideration of the specification and practice of the invention disclosed herein. Various aspects and/or components of the described embodiments may be used singly or in any combination in the systems and methods for detecting and capturing content from paper documents. It is intended that the specification and examples be considered as exemplary only, with a true scope and spirit of the invention being indicated by the following claims.

What is claimed is:

1. A computer-implemented method being performed in a computerized system comprising a processing unit, a memory and a camera, the camera being mounted on a turret operatively coupled to the processing unit, the computer-implemented method comprising:
   a. scanning a surface with the camera to acquire a first plurality of images of the surface;
   b. using the acquired first plurality of images of the surface to determine at least one location of a text on the surface;
   c. capturing a second plurality of images using the camera based on the determined location of the text on the surface; and
   d. extracting the text using the second captured plurality of images.

2. The computer-implemented method of claim 1, wherein the processing unit is configured to cause the turret to move the camera during the scanning and capturing.

3. The computer-implemented method of claim 1, wherein in a. the first plurality of images is acquired by moving the camera to a plurality of fixed positions along a predetermined path, wherein each image of the first plurality of images corresponds to a fixed position of the plurality of fixed positions, where the image was acquired.

4. The computer-implemented method of claim 3, wherein a. further comprises, for each image in the first plurality of images of the surface, computing feature points and a text response map.

5. The computer-implemented method of claim 4, wherein the each text response map is computed using a probability histogram, the probability histogram being pre-computed based on the feature points.

6. The computer-implemented method of claim 4, wherein a. further comprises stitching the text response maps corresponding to the first plurality of images into a single text response map based on the plurality of fixed positions corresponding to the first plurality of images.

7. The computer-implemented method of claim 6, wherein a. further comprises detecting text blobs in the single text response map.

8. The computer-implemented method of claim 7, wherein a. further comprises identifying at least one large rectangular shaped blob from the detected text blobs as the location of the text on the surface.

9. The computer-implemented method of claim 1, wherein in b. the second plurality of images is captured by moving the camera to a plurality of fixed positions along a predetermined path, wherein each image of the second plurality of images corresponds to a fixed position of the plurality of fixed positions, where the image was captured.

10. The computer-implemented method of claim 9, wherein the determined location of the text on the surface is a location of a text blob and wherein the predetermined path is a center line through a bounding box of the corresponding text blob.

11. The computer-implemented method of claim 9, wherein the images of the second plurality of images overlap with one another.

12. The computer-implemented method of claim 11, further comprising stitching and fusing the images of the second plurality of images to obtain a second stitched image.

13. The computer-implemented method of claim 12, further comprising fitting lines around a boundary of a text blob in the second stitched image and estimating vanishing points.

14. The computer-implemented method of claim 12, further comprising performing a perspective rectification on the second stitched image based on a computed homography.

15. The computer-implemented method of claim 14, wherein in d. the text is extracted using an optical character recognition performed on the perspective rectified second stitched image.

16. A non-transitory computer-readable medium embodying a set of computer-executable instructions, which, when executed in a computerized system comprising a processing unit, a memory and a camera, the camera being mounted on a turret operatively coupled to the processing unit, cause the computerized system to perform a method comprising:
   a. scanning a surface with the camera to acquire a first plurality of images of the surface;
   b. using the acquired first plurality of images of the surface to determine at least one location of a text on the surface;
   c. capturing a second plurality of images using the camera based on the determined location of the text on the surface; and
   d. extracting the text using the second captured plurality of images.

17. The non-transitory computer-readable medium of claim 16, wherein the set of computer-executable instructions configures the processing unit to cause the turret to move the camera during the scanning and capturing.

18. The non-transitory computer-readable medium of claim 16, wherein in a. the first plurality of images is acquired by moving the camera to a plurality of fixed positions along a predetermined path, wherein each image of the first plurality of images corresponds to a fixed position of the plurality of fixed positions, where the image was acquired.

19. The non-transitory computer-readable medium of claim 16, wherein a. further comprises, for each image in the first plurality of images of the surface, computing feature points and a text response map.

20. A computerized system comprising a processing unit, a memory and a camera, the camera being mounted on a turret operatively coupled to the processing unit, the memory storing a set of computer-executable instructions causing the computerized system to perform a method comprising:
   a. scanning a surface with the camera to acquire a first plurality of images of the surface;
   b. using the acquired first plurality of images of the surface to determine at least one location of a text on the surface;
   c. capturing a second plurality of images using the camera based on the determined location of the text on the surface; and
   d. extracting the text using the second captured plurality of images.

* * * * *